US011117661B2

(12) United States Patent
Caubel

(10) Patent No.: US 11,117,661 B2
(45) Date of Patent: Sep. 14, 2021

(54) ROTARY WING DRONE COMPRISING A COLLAPSIBLE DRONE STRUCTURE

(71) Applicant: Parrot Drones, Paris (FR)

(72) Inventor: Christine Caubel, Paris (FR)

(73) Assignee: Parrot Drones, Paris (FR)

( * ) Notice: Subject to any disclaimer, the term of this patent is extended or adjusted under 35 U.S.C. 154(b) by 190 days.

(21) Appl. No.: 16/125,391

(22) Filed: Sep. 7, 2018

(65) Prior Publication Data

US 2019/0071178 A1 Mar. 7, 2019

(30) Foreign Application Priority Data

Sep. 7, 2017 (FR) ...................................... 1758270

(51) Int. Cl.

| | |
|---|---|
| ***B64C 39/02*** | (2006.01) |
| ***B64C 1/06*** | (2006.01) |
| ***B64C 1/30*** | (2006.01) |
| ***B64C 27/50*** | (2006.01) |
| ***A63H 27/00*** | (2006.01) |

(52) U.S. Cl.

CPC ......... *B64C 39/024* (2013.01); *A63H 27/007* (2013.01); *A63H 27/12* (2013.01); *B64C 1/063* (2013.01); *B64C 1/30* (2013.01); *B64C 27/50* (2013.01); *B64C 2201/024* (2013.01); *B64C 2201/20* (2013.01)

(58) Field of Classification Search

CPC ............ B64C 39/024; B64C 2201/024; B64C 2201/20; B64C 1/063; B64C 1/30; B64C 27/30; B64C 27/50; A63H 27/007; A63H 27/12

USPC ........................................................ 244/17.23

See application file for complete search history.

(56) References Cited

U.S. PATENT DOCUMENTS

| | | | | |
|---|---|---|---|---|
| 3,053,480 | A * | 9/1962 | Vanderlip | B64C 27/54 244/17.13 |
| 2014/0061362 | A1* | 3/2014 | Olm | B64C 39/005 244/2 |
| 2015/0298799 | A1 | 10/2015 | Bertrand et al. | |
| 2016/0340021 | A1* | 11/2016 | Zhang | B64C 1/30 |
| 2017/0036771 | A1* | 2/2017 | Woodman | B64D 47/08 |
| 2017/0166308 | A1* | 6/2017 | Desrochers | B64C 39/024 |
| 2017/0174336 | A1* | 6/2017 | Baba | B64C 1/30 |
| 2017/0327222 | A1* | 11/2017 | He | B64C 27/08 |
| 2018/0257447 | A1* | 9/2018 | Nam | B64C 37/00 |
| 2018/0327092 | A1* | 11/2018 | Deng | B64C 39/024 |

(Continued)

FOREIGN PATENT DOCUMENTS

| | | |
|---|---|---|
| CN | 104691749 A | 6/2015 |
| CN | 105947202 A | 9/2016 |
| CN | 106184704 A | 12/2016 |

(Continued)

OTHER PUBLICATIONS

Search Report for FR Application 1758270 dated Apr. 27, 2018.

*Primary Examiner* — Brady W Frazier

(74) *Attorney, Agent, or Firm* — Thompson Coburn LLP; Steven M. Ritchey

(57) ABSTRACT

The rotary wing drone comprises at least one rotor carried by a drone structure, wherein the drone structure comprises a drone body and at least one group of arms comprising a plurality of arms rotatably mounted on the drone body about the same axis of rotation, between a deployed position for flight and a folded position for transport.

10 Claims, 3 Drawing Sheets

2 8 16 4 10 Z X Y 6 16 18 A 12 14 A 4 16 8 16 4 6 16 14 16 35 6 56 14 14 58 52 4 54 58 20 6 18 50 16 8

(56) References Cited

U.S. PATENT DOCUMENTS

| | | | | |
|---|---|---|---|---|
| 2019/0112025 | A1 * | 4/2019 | Sugaki | B64C 1/063 |

FOREIGN PATENT DOCUMENTS

| | | | |
|---|---|---|---|
| WO | 16148784 | A1 | 9/2016 |
| WO | 17121038 | A1 | 7/2017 |
| WO | 17143501 | A1 | 8/2017 |

* cited by examiner 2
4
6
8
10
12
14
16
18
20
35
50
52
54
56
58
A
X
Y
Z

ROTARY WING DRONE COMPRISING A COLLAPSIBLE DRONE STRUCTURE

CROSS-REFERENCE TO RELATED APPLICATIONS

This application claims the benefit of FR Application No. 17 58270, filed Sep. 7, 2017, which is incorporated herein by reference in its entirety.

TECHNICAL FIELD

The present invention relates to the field of rotary wing drones comprising a foldable drone structure.

BACKGROUND

A rotary wing drone comprises a drone structure and at least one rotor to provide vertical lift for the drone structure, wherein each rotor is carried by the drone structure.

In order to facilitate the transport of a rotary wing drone, it is possible to provide a foldable drone structure, which can pass from a deployed configuration intended for the flight of the drone, to a folded configuration that is intended for transport and enables the drone structure to be more compact.

Such a drone structure may comprise, for example, a drone body and several arms articulated on the drone structure. Each arm may, for example, carry a respective rotor of the rotary wing.

However, a foldable drone structure may prove to be heavier than a non-foldable drone structure, for example because of the presence of the articulations of the foldable structure. Increasing the weight of the drone structure may affect the flight dynamics of the drone and/or its flight range.

SUMMARY OF THE INVENTION

One of the objects of the invention is to propose a rotary wing drone having a foldable drone structure that may have a contained weight.

To this end, the invention proposes a rotary wing drone comprising at least one rotor carried by a drone structure, wherein the drone structure comprises a drone body and at least one group of arms comprising a plurality of arms rotatably mounted on the body of the drone about the same axis of rotation, between a deployed position for flight and a folded position for transport.

The provision of a group of arms comprising several arms mounted on the body of the drone to rotate about the same axis of rotation may allow the arms to share a common articulation system, which reduces the number of articulation systems and the weight of the drone structure. In addition, the drone body may be configured with a limited number of places to receive the articulation systems, which can thus limit the weight of the drone body itself.

According to particular embodiments, the drone may include one or more of the following optional features, taken in isolation or in any technically feasible combination:

- each arm supports a rotor and/or is provided with a supporting foot for placing the drone on a surface;
- each arm is rotatably mounted on the drone body through an articulation system comprising an articulation assembly configured to lock the arm selectively in the deployed or folded position.
- each articulation assembly comprises a first locking member and a second locking member configured to engage with one another in order to prevent rotation of the arm relative to the drone body, and to disengage from one another to allow rotation of the arm relative to the drone, and an elastic return member configured to return the first locking member and the second locking member into engagement with one another;
- the first locking member and the second locking member are engaged with, and disengaged from, each other by axial translation along the axis of rotation;
- either the first locking member or the second locking member comprises at least one tooth, the other locking member comprising at least two notches, the tooth passing from one notch to the next when the arm is rotated between the deployed position and folded position;
- each articulation assembly comprises a tubular bushing extending along the axis of rotation, the first locking member being mounted to slide axially inside the bushing and to rotate integrally with the bushing, the return member being housed inside the bushing and pushing the first locking member towards the second locking member;
- the drone comprises a respective articulation assembly for each arm of the group of arms;
- the arms of the group of arms are rotatably mounted on the drone body by means of the same common articulation shaft extending along the axis of rotation;
- at least one or each group of arms comprises exactly two arms;
- the drone comprises at least two groups of arms, each group of arms having a respective axis of rotation distinct from that of each other group of arms;
- at least one, or each, arm of at least one, or each, group of arms is spaced apart from the drone body in the deployed position and folded against the drone body in the folded position;
- at least one group of arms comprises an arm extending longitudinally along the drone body and towards the front of the drone body when this arm is in the folded position, and one arm extends longitudinally along the drone body and towards the rear of the drone body when this arm is in the folded position;
- the drone has a receiving space to receive a payload, wherein two arms are configured to extend longitudinally in order to frame the receiving space laterally when these arms are in the folded position.

BRIEF DESCRIPTION OF THE DRAWINGS

The invention and its advantages will be better understood upon reading the description below, given solely by way of nonlimiting example, and with reference to the appended drawings, wherein.

DETAILED DESCRIPTION OF PREFERRED EMBODIMENTS

Figure 1:
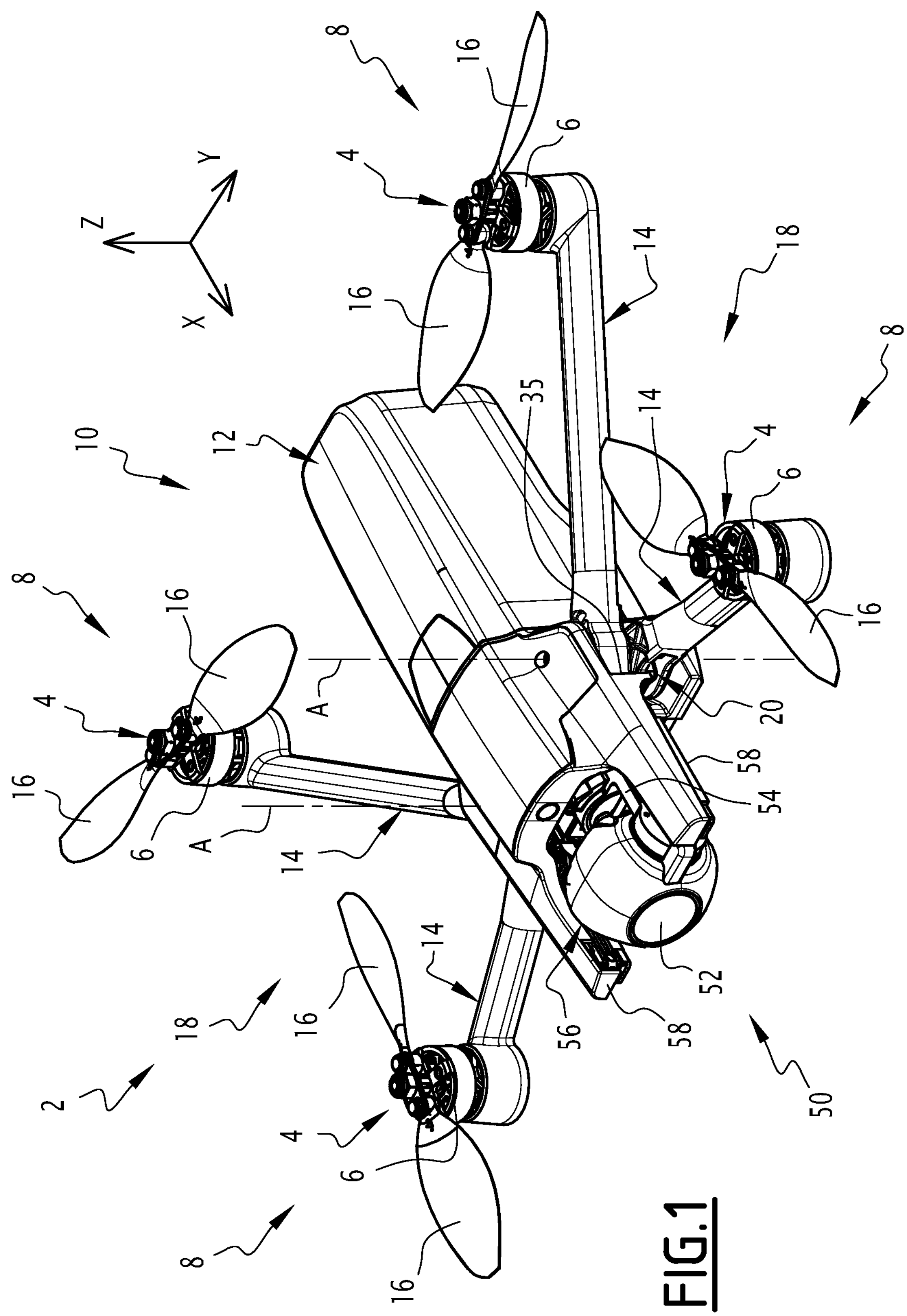
FIGS. 1 and 2 show perspective views of a drone having a foldable drone structure, wherein the drone structure has a respective deployed configuration and a folded configuration.
Figure 2:
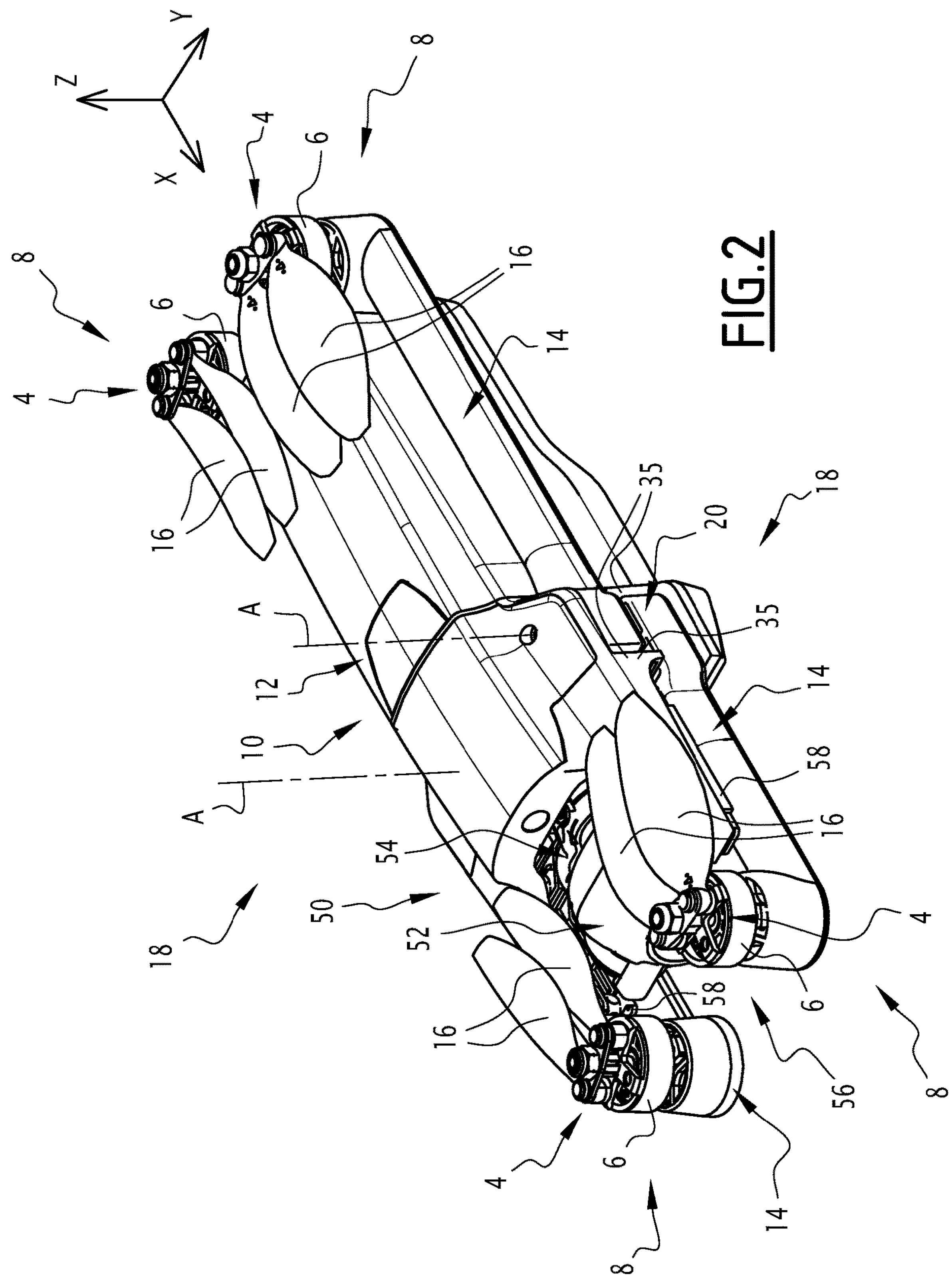

In the remainder of the description, the terms “longitudinal”, “lateral”, “horizontal”, “vertical”, “up”, “down”, “forward”, “back”, “right” and “left” extend by reference to the usual aircraft references shown in FIGS. 1 and 2, and comprising a longitudinal axis X (or roll axis), horizontal and directed from the rear to the front, a transverse axis Y (or pitch axis), horizontal and directed from the right to the left, and a vertical axis Z (or yaw axis), vertical and directed from the bottom to the top.

The drone 2 illustrated in FIGS. 1 and 2 is a rotary wing drone. The drone 2 comprises at least one rotor (or propeller) 4 configured to provide vertical lift to the drone 2.

The drone 2 comprises, for example, several rotors 4. Such a drone is referred to as "multirotor". The drone 2 here comprises exactly four rotors 4. Such a drone is named a "quadrimotor". The drone 2 could alternatively comprise a different number of rotors.

The drone 2 comprises at least one motor 6 for rotating each rotor. The drone 2 here comprises a motor respectively associated with each rotor. Each rotor 4 and the associated motor 6 form a motorized rotor assembly 8.

The drone 2 comprises a drone structure 10. Each rotor 4 is carried by the drone structure 10. More specifically, each motorized rotor assembly 8 is carried by the drone structure 10.

The drone 2 also comprises on-board electronic equipment which is also carried by the drone structure 10, and which is not visible in the figures. The on-board electronic equipment comprises, for example, a radiocommunication device, a satellite geolocation receiver and/or an inertial unit, which allow manual, assisted and/or automatic piloting of the drone.

The drone structure 10 may be folded. It may adopt a deployed configuration (FIG. 1), which is the flight configuration of the drone, and a folded configuration (FIG. 2), which is the transport configuration of the drone.

The drone structure 10 comprises a drone body 12 and foldable arms 14. Each arm 14 is rotatably mounted on the drone body 12 between a deployed position (FIG. 1) and a folded position (FIG. 2).

Each arm 14 moves from either the deployed position to the folded position and vice versa by rotation of the arm 14 about an axis of rotation A relative to the drone body 12.

The deployed position of each arm 14 corresponds to the deployed configuration of the drone structure 10, while the folded position of each arm 14 corresponds to the folded configuration of the drone structure 10.

Each arm 14 is spaced apart from the drone body 12 in the deployed position of the arm 14, and folded against the drone body 12 in the folded position.

Each arm 14 has a proximal end articulated to the drone body 12 and a free distal end. Each arm 14 is cantilevered on the drone body 12 from its proximal end that is articulated to the drone body 12.

The distal end of each arm 14 carries, for example, a respective rotor 4. The distal end of each arm 14 here carries a respective motorized rotor assembly 8.

Alternatively or optionally, the distal ends of the arms 14 may have supporting feet for placing the drone 2 on a horizontal surface and supporting it by means of these feet.

Optionally, as shown in FIG. 2, the blades 16 of each rotor 4 may be folded to facilitate the transport of the drone 2 in the folded configuration.

The arms 14 are grouped into at least one group of arms 18, in this case, two groups of arms 18, wherein each group of arms 18 comprises several of the arms 14 of the drone structure 10, wherein the arms 14 of each group of arms 18 is mounted on the drone body 12 to rotate about the one and only axis of rotation A. All the arms 14 of the same group of arms 18 share the one and only axis of rotation A for their rotation relative to the drone body 12.

The arms 14 of each arm group 18 are pivotable relative to each other.

In particular, the spacing between the 14 arms of each group of 18 arms is different in the folded and in the deployed position.

Advantageously, at least two arms 14 of each group of arms 18 are able to pass from the position among the deployed position and the folded position to the other by the rotation of the arm 14 with respect to the drone body 12 about the axis of rotation A according to a different direction of rotation. When the drone structure 10 comprises several distinct groups of arms 18, each group of arms 18 has a respective axis of rotation A, which is distinct from that of the other groups of arms 18.

The axis of rotation A of the arms 14 of each group of arms 18 is substantially vertical here.

Each group of arms 18 comprises, for example, exactly two arms 14. Thus, each group of arms 18 has a pair of arms 14 mounted to rotate on the drone body 12 about one and the same axis of rotation A.

The drone structure 10 comprises, for example, two groups of arms 18 arranged symmetrically with respect to a median longitudinal plane P of the drone structure 10. The median longitudinal plane P is the plane containing the longitudinal axis X and the vertical axis Y of the drone. The two groups of arms 18 are arranged laterally on one side of the drone 4.

The drone structure 10 here comprises four arms 14 grouped into two groups of arms 18 (or pairs of arms 18), wherein each group of arms 18 has a common axis of rotation A for the two arms 14 of this group of arms 18, which is separate from the axis of rotation A for the arms 14 of the other group of arms 18, wherein the two groups of arms 18 are arranged symmetrically with respect to the median longitudinal plane.

The arms 14 of each group of arms 18 are rotatably mounted on the drone body 12 via an articulation system 20 of the group of arms 18, which is common to all the arms 14 of this group of arms 18.

The proximal end of each arm 14 is articulated on the drone body 12 via the articulation system 20 of the group of arms 18 to which this arm 14 belongs.

Each group of arms 18 has its own respective articulation system 20 for mounting the arms 14 of this group of arms 18 so as to rotate relative the drone body 12. The articulation systems 20 of the different groups of arms 18 are similar.

Figure 3:
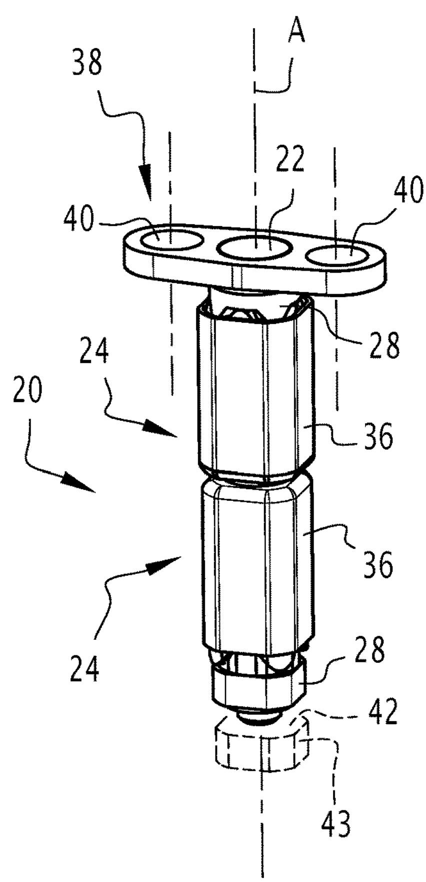
FIGS. 3 and 4 show perspective views, respectively assembled and exploded, of an articulation system common to the arms of a group of arms.
Figure 4:
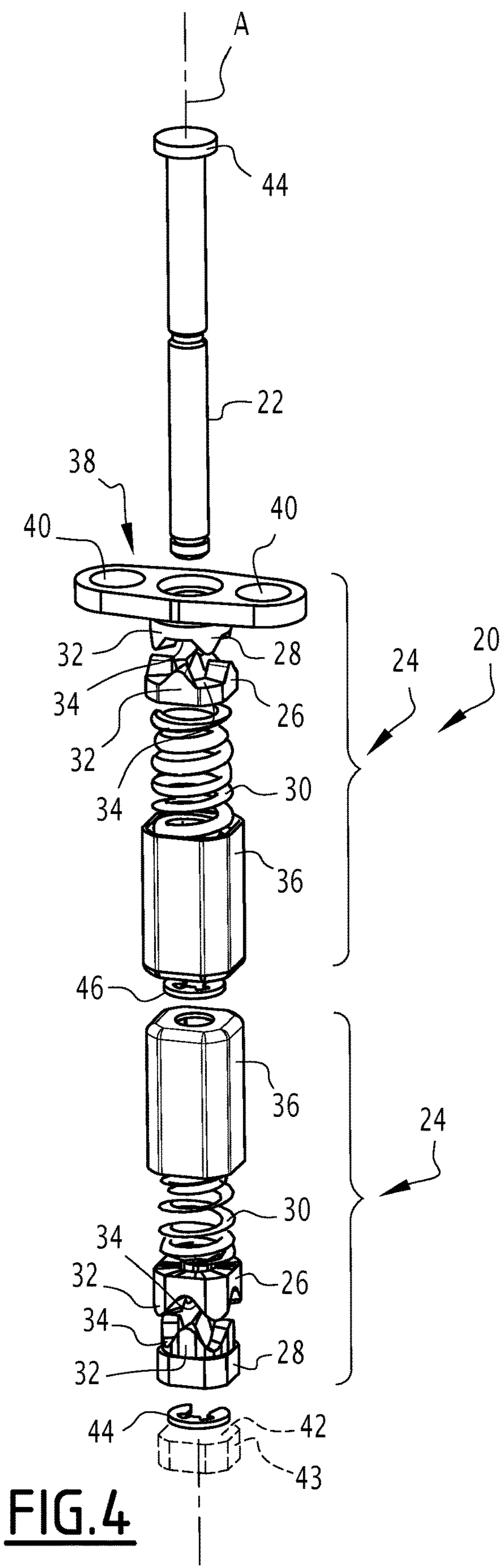

FIGS. 3 and 4 illustrate an articulation system 20 of a group of arms 18, through which the arms 14 of this group of arms 18 are rotatably mounted on the drone body 12.

The articulation system 20 comprises an articulation shaft 22 extending along the axis of rotation of the arms 14 of the group of arms 18, wherein each arm 14 of the group of arms 18 is rotatably mounted on the shaft. The articulation shaft 22 is common to the arms 14 of the group of arms 18.

The articulation system 20 comprises an articulation assembly 24 associated with each arm 14, wherein the articulation assembly 24 is configured to guide the arm 14 in rotation about the axis of rotation, and to lock the arm 14 selectively in the deployed position or in the folded position.

Each articulation assembly 24 is configured to allow the manual movement of the associated arm 14 between the deployed position and the folded position of this arm 14, with a hard point between the deployed position and the folded position.

Each articulation assembly 24 comprises a first locking member 26 and a second locking member 28 between the deployed position and the folded position, and which engage them with one another in order to lock the arm 14 selectively in the deployed or folded position of the arm 14, and to disengage them from one another to allow the rotation of the arm 14 between the folded position and the deployed position.

When the first locking member 26 and the second locking member 28 are engaged with each other, they oppose the rotation of the arm 14 between the deployed position and the folded position of the arm 14.

When the first locking member 26 and the second locking member 28 are disengaged from one another, they allow rotation of the arm 14 between the deployed position and the folded position.

The first locking member 26 and the second locking member 28 are mounted to be axially movable with respect to each other along the axis of rotation A of the arm 14, in order to selectively engage one another by moving axially towards one another, or to disengage from one another by moving axially away from one another.

In the illustrated example, the first locking member 26 is axially movable along the axis of rotation A, while the second locking member 28 is fixed axially along the axis of rotation A.

The first locking member 26 and the second locking member 28 are mounted to rotate relative to each other about the axis of rotation A of the arm 14 in order to allow rotation of the arm 14 about the axis of rotation when the first locking member 26 and the second locking member 28 are disengaged from each other.

In the illustrated example, the first locking member 26 is rotatable about the axis of rotation A, while the second locking member 28 is fixed in rotation about the axis of rotation A. The first locking member 26 is integral in rotation with the arm 14 associated with the articulation assembly 24.

The articulation assembly 24 comprises a return member 30 configured to bias the first locking member 26 and the second locking member 28 into engagement with each other.

The return member 30 is configured to oppose the disengagement of the first locking member 26 from the second locking member 28. The first locking member 26 and the second locking member 28 disengage from each other against the action of the return member 30.

The return member 30 is an elastic return member. It is arranged to permanently bias the first locking member 26 and the second locking member 28 into engagement with each other.

The return member 30 here is a helical spring arranged to push the first locking member 26 axially towards the second locking member 28, along the axis of rotation A.

The articulation assembly 24 is so configured that the forced rotation of the arm 14 between the deployed position and the folded position causes the first locking member 26 and the second locking member 28 to disengage under the action of the return member 30.

The return member 30 thus generates a resisting torque opposing the rotation of the arm 14 and having to be overcome in order to move the arm 14 between the folded position and the deployed position.

In the illustrated example, the first locking member 26 and the second locking member 28 are provided with respective contact surfaces that are inclined with respect to a plane perpendicular to the axis of rotation A.

The inclined contact surfaces include first contact surfaces that come into contact upon rotation of the arm 14 to the deployed position, and second contact surfaces that come into contact upon rotation of the arm 14 to the folded position.

The inclined contact surfaces are inclined so that, during the forced rotation of the arm 14 towards the deployed position or towards the folded position, the inclined contact surfaces come into contact and cause the axial spacing of the first locking member 26 and the second locking member 28 against the return member 30 until disengagement.

This makes it possible to move the arm 14 between the folded position and the deployed position, with a hard point between the two positions.

In an exemplary embodiment, at least either the first locking member 26 or the second locking member 28 is provided with at least one tooth 32, while the other locking member comprises at least two notches 34, wherein each tooth 32 passes from one notch 34 to the next notch 34 during the rotation of the arm 14 between the deployed position and the folded position of the arm 14.

Each inclined contact surface is a lateral face of a tooth 32 or a notch 34.

Optionally, each articulation assembly 24 is configured so that, in the deployed position and/or in the folded position, each arm 14 is biased to rotate against a rotational stop provided on the drone body, due to the action of the return member 30. This limits the vibrations of the arm 14 in the deployed or folded position.

In the present case, when the arm 14 is in the deployed position, the first locking member 26 and the second locking member 28 are in contact through the inclined contact surfaces that are so inclined that the arm 14 is biased against a corresponding rotational stop under the action of the return member 30.

Alternatively or optionally, when the arm 14 is in the deployed position, the first locking member 26 and the second locking member 28 are in contact via inclined contact surfaces that are so inclined that the arm 14 is biased against a corresponding rotational stop under the action of the return member 30.

Each rotational stop is, for example, formed on the drone body 12. In FIG. 1, a rotational stop 35 for locking an arm 14 in the deployed position is visible. In FIG. 2, this rotational stop 35 and the rotational stop 35 for locking the other arm 14 of the same group of arms 18 in the deployed position, are visible.

In the illustrated example, the first locking member 26 and the second locking member 28 are each provided with a plurality of teeth 32 delimiting notches 34 between them, wherein each notch 34 of one locking member is configured to receive a tooth 32 of the other locking member.

The teeth 32 and the notches 34 of either the first locking member 26 or the second locking member 28 are distributed circumferentially around the axis of rotation A.

The teeth 32 of either the first locking member 26 or the second locking member 28 are offset by an angle greater than the angle of rotation of the arm 14 between the deployed position and the folded position.

This ensures that in the deployed position and/or the folded position, each tooth 32 and the notch 34 receiving the tooth 32, are supported via their inclined lateral faces to ensure the biasing of the arm 14 against an associated rotational locking stop.

The first locking member 26 and the second locking member 28 each comprise four teeth 32 distributed at 90° and delimiting between them four notches 34 distributed at 90°. The angle of rotation of each arm 14 between the folded position and the deployed position is for example between 45° and 80°.

When the arm 14 rotates between the deployed position and the folded position, each tooth 32 of the first locking member 26 passes a notch 34 of the second locking member 28 to the adjacent notch 34 by passing over the tooth 32 of the second locking member 28 located between these two notches 34.

In the illustrated example, the second locking member 28 is fixedly mounted on the drone body 12, while the first locking member 26 is mounted to rotate integrally with the arm 14 about the axis of rotation A.

The return member 30 is arranged to push the first locking member 26 axially along the axis of rotation A in order to keep it engaged with the first locking member 26.

Each articulation assembly 24 here comprises a tubular bushing 36 that is mounted on the drone body 12 to rotate about the axis of rotation, wherein the first locking member 26 is slidably mounted inside the bushing 36 rotates integrally with the bushing 36, wherein the return member 30 is housed axially inside the bushing 36 between an inner shoulder of the bushing 36 and the first locking member 26, so as to push the first locking member 26 towards the second locking member 28.

In the illustrated example, the bushing 36 and the first locking member 26 respectively have an inner surface and an outer surface interacting with each other in order to rotate the bushing 36 and the first locking member 26 together about the rotation axis A.

The inner surface and the outer surface, for example, each have at least one planar facet to ensure the rotational connection. The inner surface and outer surface here are square (with rounded corners) and complementary.

In the example shown, the bushing 36 is separate from the arm 14, wherein the arm 14 is mounted on the bushing 36, while the arm 14 and the bushing 36 rotate integrally about the axis of rotation.

To do this, the arm 14 comprises, for example, a housing to receive the bushing 36, wherein the housing and the bushing 36 respectively have an inner surface and an outer surface which interact in order to rotate the arm 14 and the bushing 36.

The inner surface and the outer surface each have, for example, at least one planar facet to ensure the rotational connection. The outer surface of the bushing 36 here is square (with rounded corners). The housing of the arm 14 may have a complementary inner square surface (with rounded corners).

In a variant, the bushing 36 and the arm 14 are made integrally of one piece of material. The bushing 36 constitutes a proximal end of the arm 14 articulated on the drone body 12 by the articulation system 20.

The second locking member 28 of each articulation assembly 24 is fixedly mounted on the drone body 12.

In the example illustrated in FIGS. 3 and 4, the second locking member 28 of one of the two articulation assemblies 24 comprises a fixing base 38 with holes 40 for screwing it onto the drone body 12.

The second locking member 28 of the other articulation assembly 24 is configured to be housed in a cavity 42 of a fixing part 43 that is fixed to the drone body 12, wherein it is locked in rotation in this cavity 42.

The fixing part 43 is configured so that the second locking member 28 is in radial abutment against one side of the cavity 42 in order to bias the return member 30.

This second locking member 28 and the cavity 42 respectively have an outer surface and an inner surface interacting with each other in order to keep the second locking member 28 fixed in rotation relative to the drone body 12. This second locking member 28 has an outer square surface (with rounded corners).

Each articulation assembly 24 is put onto the articulation shaft 22 of the articulation system 20. The articulation shaft 22 is engaged through each articulation assembly 24. The articulation shaft extends through the first locking member 26, the second locking member 28 and the bushing 36 of each articulation assembly 24. In the present case, it also extends inside the return member 30 of each articulation assembly 24, and that is in the form of a helical spring.

In the example illustrated in FIGS. 3 and 4, the bushing 36 and the first locking member 26 ensure the rotational guidance of the arm 14 on the articulation shaft 22 about the axis of rotation A, wherein the first locking member 26 further interacts with the second locking member 28 under the action of the return member 30 for the selective rotational locking of the arm 14 in the deployed or folded position.

Each articulation assembly 24 is received on a respective section of the articulation shaft 22.

In the example illustrated, the articulation shaft 22 is provided with axial stops 44, 46, wherein each articulation assembly 24 is arranged axially on a section delimited between two axial stops 44, 46.

Each articulation assembly 24 has its bushing 36 abutting against an axial stop 46, while its second locking member 28 abuts against another axial stop 44, wherein the first locking member 26 slides axially along the shaft and into the bushing 36 to engage or disengage the second locking member 28.

The articulation shaft 22 is provided with three axial stops comprising two end axial stops 44 and an intermediate axial stop 46, wherein each articulation assembly 24 is arranged between the intermediate axial stop 46 and one of the two end axial stops 44.

An axial stop, in this case the end axial stop 44 located on the side of the first locking member 28 provided with the mounting base 38, is formed by a flange of the articulation shaft 22 formed integrally with the articulation shaft 22 of a single piece of material, while the two other axial stops 44, 46 are attached and mounted on the articulation shaft 22, wherein each is in a groove on the articulation shaft 22.

In operation, to pass each arm 14 from the deployed position to the folded position, the user manually forces the arm 14 to rotate it, wherein, in so doing, the arm 14 forces the first locking member 26 to rotate about the axis of rotation. The first locking member tends to disengage axially away from the first locking member to allow each tooth 32 to exit the notch 34 in which it was engaged. The first locking member 26 moves axially against the elastic return member 30. When each tooth 32 is faces the next notch 34, the first locking member 26 engages with the second locking member 28, and the arm 14 is locked again, in the folded position this time.

To move from the folded position to the deployed position, the user acts in the same way by manually forcing the arm 14 to pivot relative to the drone body 12, but in the opposite direction.

Returning to FIGS. 1 and 2, the drone body 12 is configured to carry a payload on the drone body 12.

The payload may, for example, be permanently mounted on the drone body 12. Alternatively, the drone body 12 may be provided with a mounting device (not visible) for rapid assembly and disassembly of the payload. The mounting device is for example a mounting ring that is mounted by screwing or through a bayonet connection.

As illustrated in FIGS. 1 and 2, the payload is, for example, an image capture system 50 comprising an image capture device 52, in particular a camera.

The image capture system here comprises an orientation device 54 for controlling the orientation of the image capture device 52 relative to the drone body 12.

The orientation device 54 may be oriented by rotation about two orientation axes that are perpendicular to each other, namely the longitudinal axis X and the transverse axis Y. In a variant, it may allow orientation about three orientation axes that are perpendicular to each other, and which are, for example, the longitudinal axis X, the transverse axis Y, and the vertical axis Z.

The drone body 12 has a receiving space 56 to receive the payload. The receiving space 56 is located at one end of the drone body 12 along the longitudinal axis X, in this case at the front end of the drone body 12.

Optionally, and as illustrated in FIGS. 1 and 2, the drone body 12 may have two longitudinal extensions 58 protruding laterally on either side of the receiving space 56. The longitudinal extensions 58 here protrude forwards.

Such longitudinal extensions 58 make it possible to protect and/or maintain the payload laterally without hindering the field of view of the image capture device 52 when the payload is an image capture system 50.

In the folded position, two arms 14, each belonging to a respective group of arms 18, extend longitudinally by being placed laterally on either side of the receiving space 56. The two arms 14 in the folded position extend on either side of the drone body 12 symmetrically with respect to the median longitudinal plane P.

Thus, in the folded position, these two arms 14 of the drone protect the payload received in the receiving space 56, by being placed laterally on either side of the receiving space 56 and therefore the payload.

These two arms 14 in the folded position extend substantially parallel to each other along the longitudinal axis X.

In addition, optionally, the distal ends of these two arms 14 partially close the receiving space 56 longitudinally. The receiving space 56 is thus situated longitudinally between the drone body 12 and the distal end of each of the two arms 14 flanking the receiving space 56.

Optionally, at least one of the two arms 14 flanking the receiving space 56 has a wedging member that is configured to wedge the payload in a transport position when the arm 14 is in the folded position.

In particular, when the payload comprises an orientation device 54, the wedging of the payload makes it possible to avoid uncontrolled movements of the payload which could damage it.

Thus, in the folded position of the arms 14, the payload is surrounded by the drone body 12 and the arms 14, and protected by them. As a result, it is possible to limit the risk of damage to the payload during transport of the drone 2 in the folded configuration.

In the illustrated example, each group of arms 18 comprises a front arm 14 and a rear arm 14.

The receiving space 56 is located at the front longitudinal end of the drone body 12, while the arms 14 in the folded position frame the receiving space 56.

In the folded position, the free ends of the rear arms 14, in particular the motorized rotor assemblies 8 carried by these free ends, are located behind the drone body 12. This allows compact storage.

In the illustrated example, the front arm 14 of each group of arms 18 extends longitudinally forwards from its proximal end from the drone body 12 when in the folded position, while the rear arm 14 of each group of arms 18 extends longitudinally rearwards from its proximal end from the drone body 12 when in the folded position.

From the deployed position of the arms 14, each front arm 14 is folded by folding towards the front of the drone body 12, while each rear arm 14 is folded by folding towards the rear of the drone body 12.

This arrangement makes it possible to obtain a drone which is particularly compact in a folded transport configuration, as illustrated in FIG. 2.

The drone 2 comprises a folding drone structure having groups of arms 18 whose arms 14 are mounted on the drone body 12 to rotate about the same axis of rotation, which allows the arms 14 of each group of arms 18 to share a common articulation system 20, and, in particular, a common articulation shaft 22. This makes it possible to limit the weight of the drone 2, which is favorable for the flight performance of the drone, its autonomy in flight and/or its ease of transport.

Each articulation system 20 ensures a simple and reliable locking of each arm 14 that is rotatably mounted on the drone body 12 by means of this articulation system 20, both in the deployed position for the flight and the folded position for transport.

The arms 14 of the folding drone structure 10 are advantageously used to protect and/or wedge a payload carried by the drone 2, in particular an image capture system 50 comprising an image capture device 52 that may be oriented relative to the drone body 12, when these arms 14 are in the folded position.

The use of foldable arms 14 for the protection of a receiving space 56 of a payload mounted on the drone 2, such as an image capture system 50, is advantageous regardless of the mounting of the arm 14 of the same group of arms 18 upon rotation about a single axis of rotation A.

Thus, in general, the invention also relates to a rotary wing drone comprising at least one rotor 4 and a drone structure 10, wherein each rotor is carried by the drone structure 10, and wherein the drone structure 10 comprises a drone body 12 and a plurality of arms 14, wherein each arm 14 is mounted on the drone body 12 to move between a deployed flight position and a folded transport position, wherein the drone body 12 has a receiving space 56 for a payload, while two arms 14 are configured to extend on either side of the receiving space 56 in the folded position of these two arms 14 in order to frame the receiving space laterally between them.

Optionally, the distal ends of these two arms 14 may be configured to close the receiving space 56 longitudinally in the folded position of these two arms 14, so that the receiving space 56 is located longitudinally between the distal ends of the two arms 14 and the drone body 12.

Similarly, the forward and backward folding configuration of the arms 14 of each group of arms 18 is advantageous independently of the articulation of the arms 14 about the same axis of rotation on the drone body 12.

Thus, in general, the invention also relates to a rotary wing drone comprising at least one rotor 4 and a drone structure 10 carrying each rotor, wherein the drone structure 10 comprises a drone body 12 and two groups of arms 18 arranged laterally on both sides of the drone, wherein each arm 14 is mounted on the drone body 12 to move between a deployed position in which the arm 14 is spaced apart from the drone body 12 and a folded position in which the arm 14 is folded against the drone body 12, and wherein each group of arms 18 comprises an arm 14 which folds forwards, and an arm 14 which folds backwards.

The invention claimed is:

1. A rotary wing drone comprising at least one rotor carried by a drone structure, wherein the drone structure comprises:

a drone body and at least two groups of arms, each group of arms comprising a plurality of arms and an axis of rotation that is separate from the axis of rotation of each other group of arms, and wherein each arm of each group is rotatably mounted on the drone body about the axis of rotation of said group of arms between a deployed position for flight and a folded position for transport; and an articulation system for each group of arms which comprises an articulation assembly associated with each arm of each group of arms, wherein each articulation assembly is configured to lock the associated arm selectively in the deployed position and the folded position, wherein each articulation assembly comprises:

a first locking member and a second locking member configured to engage with one another to prevent the rotation of the associated arm relative to the drone body and to disengage from one another to allow rotation of the associated arm relative to the drone, wherein the first locking member and the second locking member engage with, and disengage from, each other by axial translation along the axis of rotation; and an elastic return member configured to return the first locking member and the second locking member into engagement with one another.

2. The rotary wing drone according to claim 1, wherein each arm carries a rotor.

3. The rotary wing drone according to claim 1, wherein either the first locking member or the second locking member comprises at least one tooth and the other locking member comprising at least two notches, each tooth passing from one of the at least two notches to an adjacent notch of the at least two notches during the rotation of the arm between the deployed position and the folded position.

4. The rotary wing drone according to claim 1, wherein each articulation assembly comprises a tubular bushing extending along the axis of rotation, the first locking member being mounted to slide axially inside the bushing and to rotate integrally with the bushing, the elastic return member being housed inside the bushing and pushing the first locking member towards the second locking member.

5. The rotary wing drone according to claim 1, wherein the arms of each group of arms are rotatably mounted on the drone body via a single articulation shaft extending along the axis of rotation.

6. The rotary wing drone according to claim 1, wherein each group of arms comprises exactly two arms.

7. The rotary wing drone according to claim 1, wherein each arm of each group of arms is spaced apart from the drone body in the deployed position and folded against the drone body in the folded position.

8. The rotary wing drone according to claim 1, wherein, for at least one of the at least two groups of arms, one of the arms extends longitudinally along the drone body from the axis of rotation towards the front of the drone body when said arm is in the folded position, and another of the arms extends longitudinally along the drone body from the axis of rotation towards the rear of the drone body when said is in the folded position.

9. The rotary wing drone according to claim 1, wherein the drone has a receiving space to receive a payload, wherein two arms are configured to extend longitudinally to frame the receiving space laterally when these arms are in the folded position.

10. The rotary wing drone according to claim 1, wherein each axis of rotation is vertical.

* * * * *